US010616097B2

(12) United States Patent
Brissette et al.

(10) Patent No.: US 10,616,097 B2
(45) Date of Patent: Apr. 7, 2020

(54) LOCAL SWITCHING FOR FLEXIBLE CROSS-CONNECT VLAN-AWARE BASED SERVICE

(71) Applicant: Cisco Technology, Inc., San Jose, CA (US)

(72) Inventors: Patrice Brissette, Gatineau (CA); Ali Sajassi, San Ramon (CA); Ramanathan Lakshmikanthan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 15/809,140

(22) Filed: Nov. 10, 2017

(65) Prior Publication Data

US 2019/0149456 A1 May 16, 2019

(51) Int. Cl.
| | |
|---|---|
| *H04L 12/703* | (2013.01) |
| *H04L 12/46* | (2006.01) |
| *H04L 12/24* | (2006.01) |
| *H04L 12/723* | (2013.01) |
| *H04L 12/751* | (2013.01) |

(52) U.S. Cl.
CPC ............ *H04L 45/28* (2013.01); *H04L 12/462* (2013.01); *H04L 12/4641* (2013.01); *H04L 41/00* (2013.01); *H04L 45/02* (2013.01); *H04L 45/50* (2013.01)

(58) Field of Classification Search
CPC ............................ H04L 45/28; H04L 12/4641
See application file for complete search history.

(56) References Cited

U.S. PATENT DOCUMENTS

| | | |
|---|---|---|
| 2011/0188499 A1 | 8/2011 | Wijnands et al. |
| 2014/0241351 A1 | 8/2014 | Kollipara et al. |
| 2016/0337423 A1 | 11/2016 | Uchida |
| 2017/0195199 A1* | 7/2017 | Dorai .................. H04L 43/0811 |
| 2017/0244593 A1* | 8/2017 | Rangasamy ........ H04L 41/0654 |
| 2018/0006995 A1* | 1/2018 | Bickhart ............. H04L 12/4625 |
| 2018/0331953 A1* | 11/2018 | Hoang .................... H04L 45/50 |

\* cited by examiner

*Primary Examiner* — Rhonda L Murphy
(74) *Attorney, Agent, or Firm* — Merchant & Gould P.C.

(57) ABSTRACT

Local switching may be provided over a flexible cross-connect VLAN-aware based service. First, a failure of a first segment link of a first segment may be detected by a first network device. The first segment may have a first segment identifier and the first segment link may be connected to the first network device. Next, a route withdraw indicating the first segment identifier may be sent by the first network device in response to detecting the failure of the first segment link of the first segment. A second network device may then receive the route withdraw. Then, the second network device may forward, in response to receiving the route withdraw, traffic received from the first network device to a second segment link of the first segment connected to the second network device. The traffic may be received from the first network device over a backup connection over an Ethernet Virtual Private Network (EVPN) core.

19 Claims, 9 Drawing Sheets

LOCAL SWITCHING FOR FLEXIBLE CROSS-CONNECT VLAN-AWARE BASED SERVICE

TECHNICAL FIELD

The present technology relates to local switching for flexible cross-connect VLAN-aware based service.

BACKGROUND

Multi-Protocol Label Switching (MPLS) is a type of data-carrying technique for high-performance telecommunications networks that directs data from one network node to the next based on short path labels rather than long network addresses, avoiding complex lookups in a routing table. The labels identify virtual links (paths) between distant nodes rather than endpoints. MPLS can encapsulate packets of various network protocols, hence its name "multiprotocol". MPLS supports a range of access technologies, including T1/E1, ATM, Frame Relay, and DSL.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
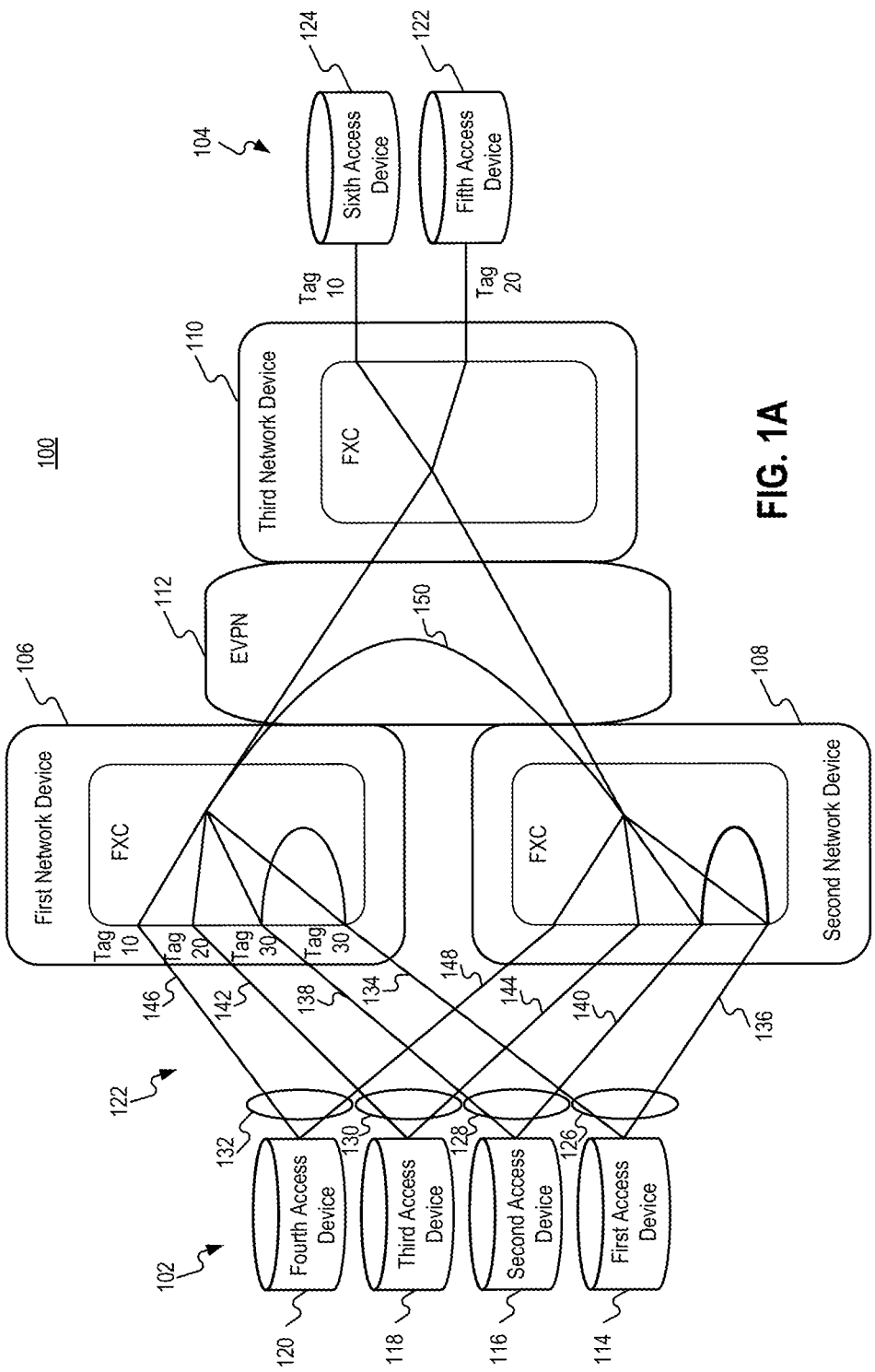
FIG. 1A is a block diagram of an operating environment for providing local switching.

Local switching may be provided over a flexible cross-connect VLAN-aware based service. First, a failure of a first segment link of a first segment may be detected by a first network device. The first segment may have a first segment identifier and the first segment link may be connected to the first network device. Next, a route withdraw indicating the first segment identifier may be sent by the first network device in response to detecting the failure of the first segment link of the first segment. A second network device may then receive the route withdraw. Then, the second network device may forward, in response to receiving the route withdraw, traffic received from the first network device to a second segment link of the first segment connected to the second network device. The traffic may be received from the first network device over a backup connection over an Ethernet Virtual Private Network (EVPN) core.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A computer network can include a system of hardware, software, protocols, and transmission components that collectively allow separate devices to communicate, share data, and access resources, such as software applications. More specifically, a computer network may be a geographically distributed collection of nodes interconnected by communication links and segments for transporting data between endpoints, such as personal computers and workstations. Many types of networks may be available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs may connect nodes over dedicated private communications links located in the same general physical location, such as a building or campus. WANs, on the other hand, may connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet may be an example of a public WAN that connects disparate networks throughout the world, providing global communication between nodes on various networks. The nodes may communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can extend the size or footprint of the network.

A service provider network can provide service to customer networks via Provider Edge (PE) devices (e.g., routers or switches) that may be located at the edge of the service provider network. Each PE device may be connected directly to a Customer Edge (CE) device (e.g., host, router or switch) located at the edge of a customer network. In other cases, an Access Network (AN) may provide connectivity (via Ethernet Virtual Circuits (EVC)) in order to interconnect PE and CE devices. In some instances, the AN can be an Ethernet Access Network (EAN) that can support EVCs by utilizing 802.1Q encapsulations. In other embodiments, the AN may be an IP or a MPLS network that may support EVCs by utilizing Ethernet over IP encapsulation or Ethernet over MPLS encapsulation, respectively. The PE devices in a service provider network may be connected by a Multi-Protocol Label Switching (MPLS) infrastructure that provides benefits such as fast-reroute and resiliency. The PE devices may also be connected by an IP infrastructure that utilizes Generic Routing Encapsulation (GRE) tunneling or other IP tunneling between the PE devices.

An Ethernet Virtual Private Network (EVPN) may be a layer 2 virtual private network (VPN) technology built over a Packet Switched Network (PSN) (e.g., utilizing an MPLS/IP infrastructure). An EVPN instance may include CE devices that may be connected to PE devices that may form the edge of the MPLS infrastructure. An EVPN instance can include one or more broadcast domains (e.g., one or more VLANs) that may be assigned to a given EVPN instance by the provider of the EVPN service. The PE devices provide virtual layer 2 bridged connectivity between the CE devices. A service provider network can include multiple EVPN instances. EVPN may provide advanced multi-homing capabilities and may use Border Gateway Protocol (BGP) to distribute customer MAC address information over the core MPLS network.

EVPN can provide a service provider network with solutions for multipoint Ethernet services utilizing MPLS/IP networks and advanced multi-homing capabilities. For example, EVPN may support single-homed devices, single-homed networks, multi-homed devices and multi-homed networks. A customer multi-homed device or a customer multi-homed network may tolerate certain network failures because the connection to two or more PE devices may provide additional redundancy. In all-active redundancy mode, all of the PEs attached to a customer multi-homed device/network may be allowed to forward known unicast traffic to/from that customer device or customer network. In single-active redundancy mode, only a single PE (the designated forwarder), among a group of PEs attached to a customer multi-homed device/network, may be allowed to forward any traffic to/from the customer device or customer network. In the event a failure occurs at the PE device that is the designated forwarder, a new designated forwarder can be elected in order to maintain network connectivity.

In the case where a CE device/network may be multi-homed to two or more PE devices, the set of Ethernet links between the CE device and the PE devices may constitute an Ethernet Segment (ES). In instances when an AN is used, a port (physical or logical (e.g., bundle)) on a PE device acts as a Network-to-Network Interface (NNI). In this context, NNIs may be used to aggregate and interconnect customers to a PE device by utilizing access Ethernet Virtual Circuits (EVCs). An External NNI (ENNI) may be used when the AN is built and operated by a third-party Service Provider. An Ethernet Segment that consists of EVCs instead of physical links may be referred to as a Virtual Ethernet Segment (vES).

The use of virtual Ethernet Segments may expand the capability of a single PE device. In the case of an ES, the PE may be limited to having a single CE device connected to each of its ports (i.e., there is a one-to-one relationship between a CE device and a physical/logical port (e.g., a bundle such as a 2×10GE bundle) on the PE. In the case of a vES, the PE device can be configured to provide service to thousands of customers over a common NNI that terminates access EVCs interconnecting thousands of CE devices).

Embodiments of the disclosure may leverage the capabilities of a Flexible Cross-Connect (FXC) VLAN-aware domain. This domain, for example, may allow different access interfaces to perform local switching when they have matching tags (i.e., VLAN tags). Consistent with embodiments of the disclosure, at least two routers may be peered together using, for example, EVPN BGP Route Type-4 (RT-4) to create a redundancy peering group. Accordingly, upon failure on one of the access interface (i.e., segments) on one of the routers in the redundancy peering group, traffic may be switched over the EVPN core to a peer router in the redundancy peering group. Based on the EVPN RT-4 (per Ethernet-Segment), embodiments of the disclosure perform routing of the traffic over the EVPN core to an access interface matching the same tags on the peer router. This process may be compatible with current FXC VLAN-aware based services where it allows connection with remote PE without performing any local switching. Furthermore, as described in greater detail below, embodiments of the disclosure may work with, but not limited to, two label options: i) label per <Ethernet Segment Identifier (ESI), EVPN instance (EVI)>; and ii) label per <ESI>.

FIG. 1A is a block diagram of an operating environment 100 for providing local switching. Operating environment 100 may comprise, but is not limited to, a Multi-Protocol Label Switching (MPLS) network cable of providing flexible cross-connect VLAN-aware based service. As shown in FIG. 1A, operating environment 100 may comprise a first end plurality of edge devices 102, a second end plurality of edge devices 104, a first network device 106, a second network device 108, a third network device 110, and an Ethernet Virtual Private Network (EVPN) core 112. First network device 106, second network device 108, and third network device 110 may comprise, but are not limited to, routers and may be configured to provide FXC VLAN-aware services.

First end plurality of edge devices 102 may comprise a first access device 114, a second access device 116, a third access device 118, and a fourth access device 120. Second end plurality of edge devices 104 may comprise a fifth access device 122 and a sixth access device 124. First end plurality of edge devices 102 and second end plurality of edge devices 104 may comprise edge devices (e.g., routers) that may communicate over operating environment 100. For example, first end plurality of edge devices 102 and second end plurality of edge devices 104 may comprise CE or PE devices.

Operating environment 100 may also comprise an Access Network (AN) 122 that may provide connectivity between first end plurality of edge devices 102 and first network device 106 and second network device 108. AN 122 may comprise, but is not limited to, an Ethernet Access Network (EAN), a MPLS network, or an IP network. First end plurality of edge devices 102 and AN 122 may be built and/or operated by a single service provider. First end plurality of edge devices 102 and AN 122 may be built and/or operated by separate entities or by separate divisions associated with a service provider. Consistent with embodiments of the disclosure, AN 122 may include additional network components.

Each of first end plurality of edge devices 102 in operating environment 100 may comprise one or more ports that may be used to provide network connectivity to first end plurality of edge devices 102 via AN 122. The ports on any of first end plurality of edge devices 102 may comprise, but are not limited to, physical ports such as a 10GE interface or logical ports such as a 2×10GE bundle. For example, any of first end plurality of edge devices 102 may have one or more physical or logical ports such as Network-to-Network Interfaces (NNI) (not shown). AN 122 may comprise a plurality of segments connecting first end plurality of edge devices 102 and first network device 106 and second network device 108. The plurality of segments may comprise a first segment 126, a second segment 128, a third segment 130, and a fourth segment 132. As shown in FIG. 1A, first segment 126 may have a VLAN TAG=30, second segment 128 may have a VLAN TAG=30, a third segment 130 may have a VLAN TAG=20, and a fourth segment 132 may have a VLAN TAG=10. Each of the plurality of segments may comprise, but are not limited to, Ethernet Segments (ESs) (e.g., that may comprise Ethernet Virtual Circuits (EVCs) instead of physical links) that may be referred to as a Virtual Ethernet Segment (vES). vESs may include multiple EVCs.

As shown in FIG. 1A, first segment 126 may comprise a first segment first link 134 and a first segment second link 136. Similarly, second segment 128 may comprise a second segment first link 138 and a second segment second link 140. Also, third segment 130 may comprise a third segment first link 142 and a third segment second link 144. And fourth segment 132 may comprise a fourth segment first link 146 and a fourth segment second link 148. First segment first link 134, first segment second link 136, second segment first link 138, second segment second link 140, third segment first link 142, third segment second link 144, fourth segment first link 146, and a fourth segment second link 148 may each comprise, but are not limited to, an EVC. EVPN core 112 may provide a backup connection 150 between first network device 106 and second network device 108 consistent with embodiments of the disclosure.

As shown in FIG. 1A, first access device 114 may connect to first network device 106 over first segment first link 134 and to second network device 108 over first segment second link 136. Second access device 116 may connect to first network device 106 over second segment first link 138 and to second network device 108 over second segment second link 140. Third access device 118 may connect to first network device 106 over third segment first link 142 and to second network device 108 over third segment second link 144. And fourth access device 120 may connect to first network device 106 over fourth segment first link 146 and to second network device 108 over fourth segment second link 148. Because first segment first link 134 and second segment first link 138 may have the same VLAN tag (e.g., TAG=30), traffic between first access device 114 and second access device 116 sent to first network device 106 may be routed locally (e.g., locally switched) without passing through EVPN core 112. Similarly, because first segment second link 136 and second segment second link 140 may have the same VLAN tag (e.g., TAG=30), traffic between first access device 114 and second access device 116 sent to second network device 108 may be routed locally without passing through EVPN core 112.

Traffic sent by third access device 118 over third segment 130 to first network device 106 and second network device 108 may be forwarded over EVPN core 112 to fifth access device 122 because links to both third access device 118 and fifth access device 122 may have a VLAN TAG=20. Similarly, traffic sent by fourth access device 120 over fourth segment 132 to first network device 106 and second network device 108 may be forwarded over EVPN core 112 to sixth access device 124 because links to both fourth access device 120 and sixth access device 124 may have a VLAN TAG=10.

Embodiments of the disclosure may provide a virtual Ethernet Segment (vES) feature in EVPN. Accordingly, an Ethernet Segment, for example, may be represented by a collection of virtual links such as Pseudo Wires (PWs) or VLANs, as opposed to physical links for example. However, conventional EVPN may use a dedicated label (e.g. an MPLS label) per Ethernet Segment (either physical or virtual) which may be referred to as ESI label. In this conventional system, there can be hundreds of thousands of virtual Ethernet Segments per network device, thus requiring the allocation of hundreds of thousands of ESI labels per network device.

Figure 1B:
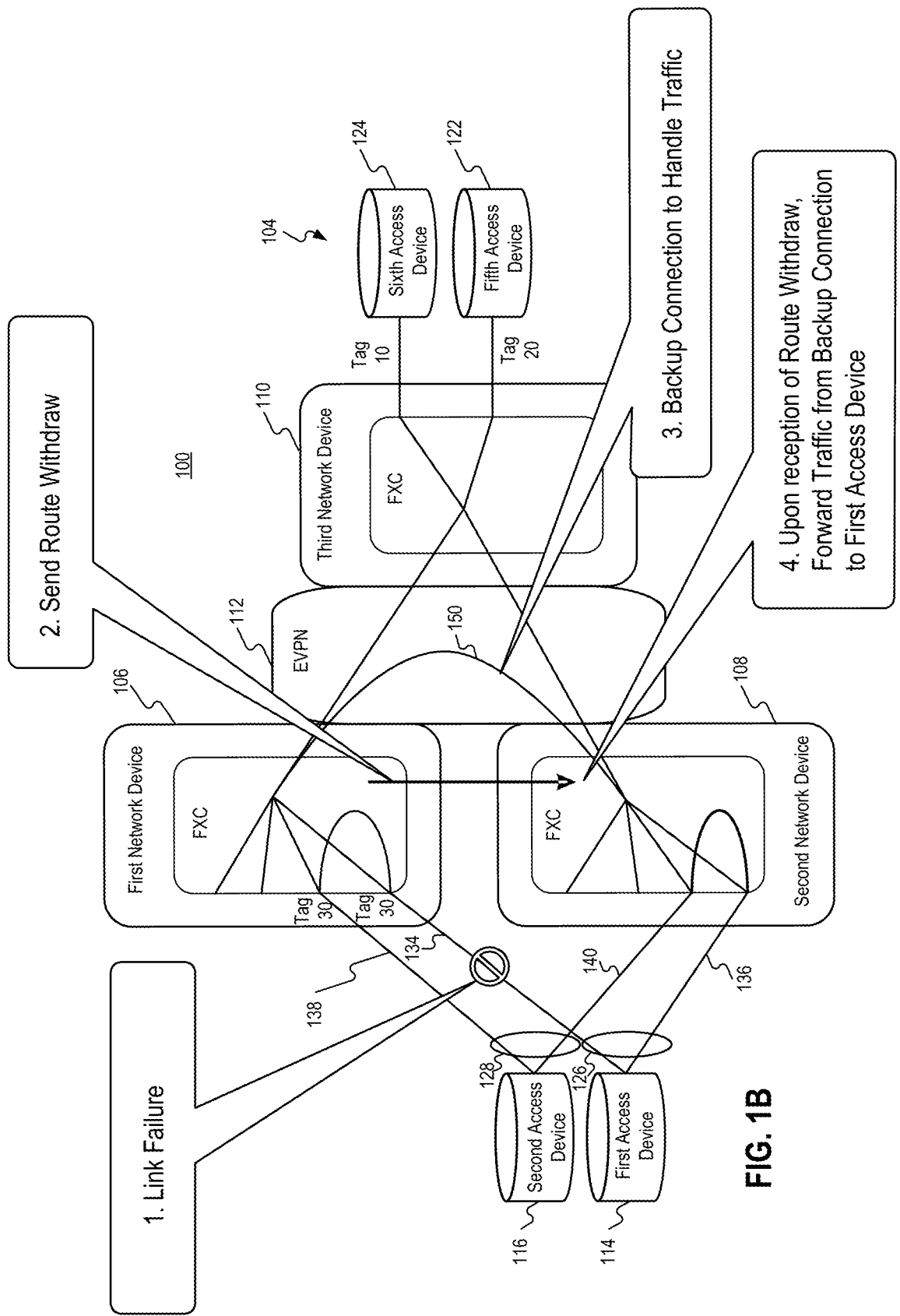
FIG. 1B is a block diagram of an operating environment for providing local switching.
Figure 2:
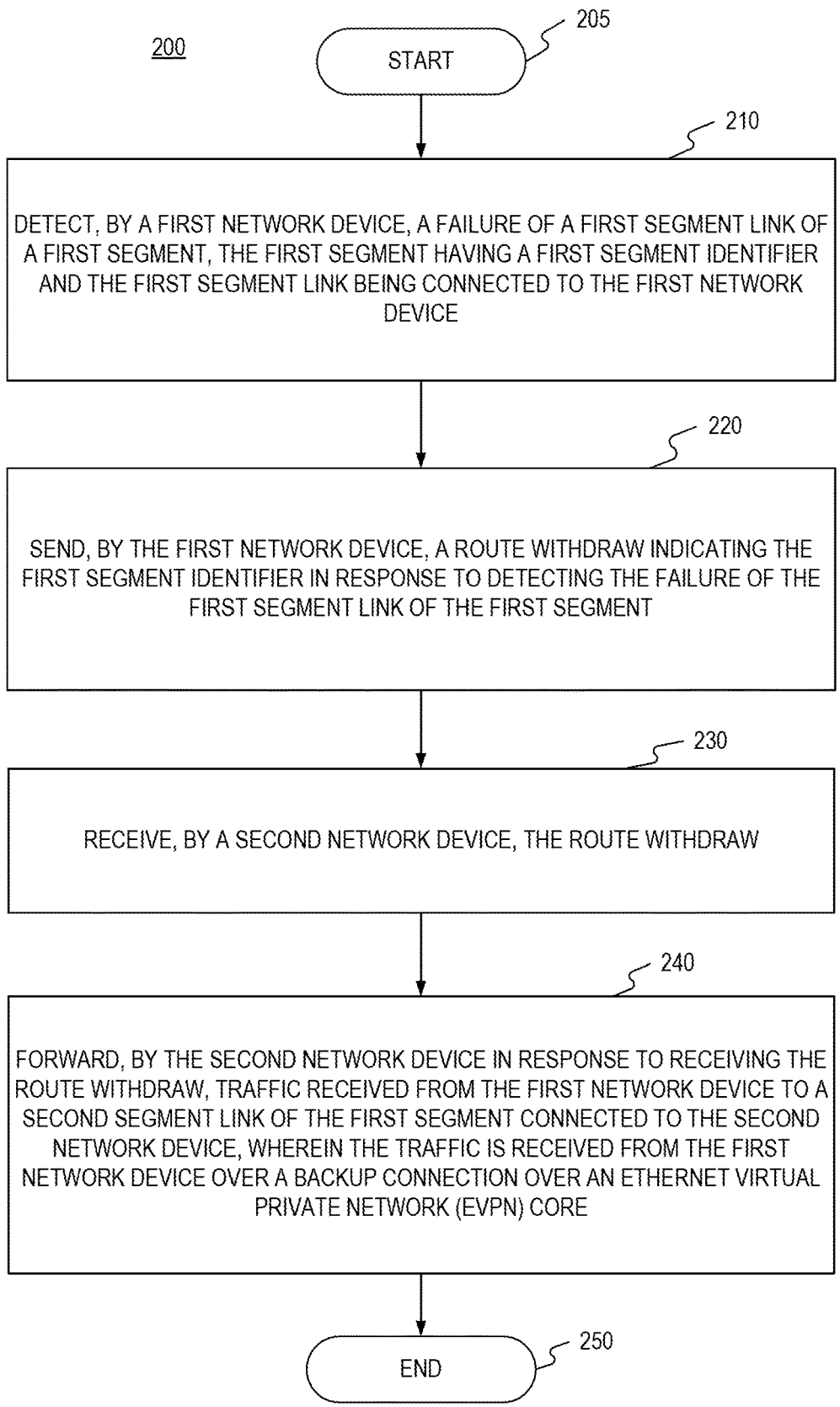
FIG. 2 is a flow chart of a method for providing local switching.

FIG. 2 is a flow chart setting forth the general stages involved in a method 200 consistent with an embodiment of the disclosure for providing local switching. Method 200 may be implemented using first network device 106 and second network device 108 as described in more detail above with respect to FIG. 1A and below with respect to FIG. 1B. Ways to implement the stages of method 200 will be described in greater detail below.

Method 200 may begin at starting block 205 and proceed to stage 210 where first network device 106 may detect a failure of first segment link (i.e., first segment first link 134) of first segment 126. First segment 126 may have a first segment identifier and first segment link may be connected to first network device 106. For example, as shown in FIG. 1B, a failure on first segment first link 134 may be detected by first network device 106. This failure may not allow data traffic to flow on first segment first link 134 between first access device 114 and first network device 106. If first segment first link 134 was not in a failed state, first network device 106 would locally route data traffic received from second access device 116 on second segment first link 138 to first access device 114 on first segment first link 134 because second segment first link 138 and first segment first link 134 may have the same VLAN tag (e.g., TAG=30) in this example.

From stage 210, where first network device 106 detects the failure of first segment link (i.e., first segment first link 134) of first segment 126, method 200 may advance to stage 220 where first network device 106 may send a route withdraw indicating the first segment identifier in response to detecting the failure of first segment link of first segment 126. For example, sending the route withdraw may comprise sending the route withdraw indicating the withdrawal of an EVPN BGP RT-4 route as will be described in greater detail below. In the example shown in FIG. 1B, first segment 126 may have the first segment identifier comprising "green" that may comprise an Ethernet Segment Identifier (ESI). Similarly, second segment 128 may have a second segment identifier comprising "red" that may also comprise an ESI.

Once first network device 106 sends the route withdraw indicating the first segment identifier in response to detecting the failure of first segment link (i.e., first segment first link 134) of first segment 126 in stage 220, method 200 may continue to stage 230 where second network device 108 may receive the route withdraw. For example, second network device 108 may receive the route withdraw comprising the withdrawal of an EVPN BGP RT-4 route.

After second network device 108 receives the route withdraw in stage 230, method 200 may proceed to stage 240 where second network device 108 may forward, in response to receiving the route withdraw, traffic received from first network device 106 to second segment link (i.e., first segment second link 136) of first segment 126 connected to second network device 108. As shown in FIG. 1B, this traffic may be received from first network device 106 over backup connection 150 over EVPN core 112. For example, upon reception of the route withdraw (e.g., RT-4 withdraw with ESI="green"), second network device 108 may be reprogrammed to forward traffic coming over backup connection 150 over EVPN core 112 with the second segment identifier (e.g., with ESI="red") to go to first segment second link 136 connected to first access device 114. Consequently, based on EVPN BGP RT-4, second network device 108 may determine traffic coming from first network device 106 (from second access device 116) is to be forwarded to first access device 114. The ESI for first access device 114 may not be the same as the ESI for second access device 116. Once second network device 108 forwards the traffic received from first network device 106 to second segment link (i.e., first segment second link 136) of first segment 126 in stage 240, method 200 may then end at stage 250.

Figure 3:
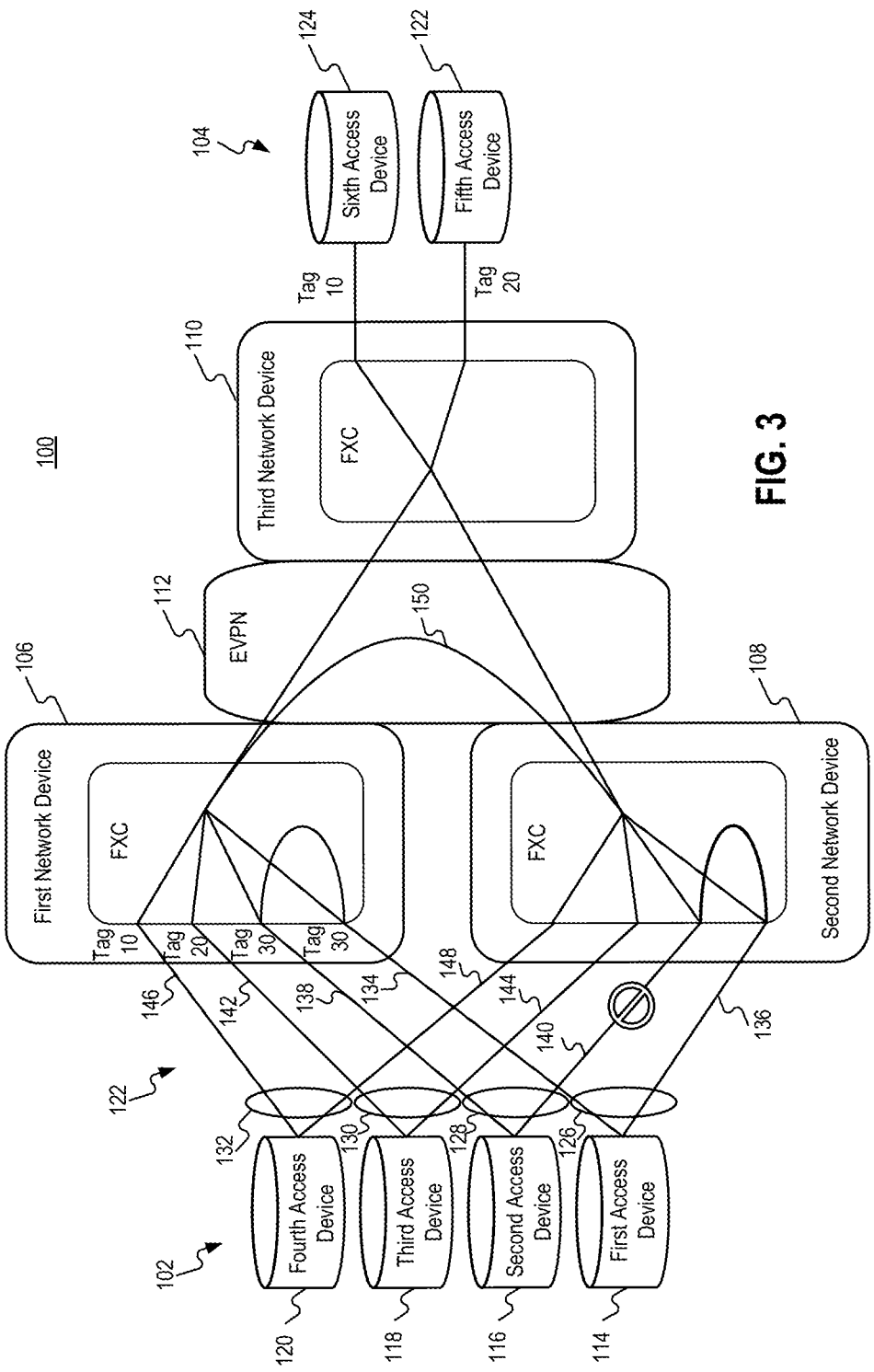
FIG. 3 is a block diagram of an operating environment for providing local switching that shows a failure on second segment second link.
Figure 4:
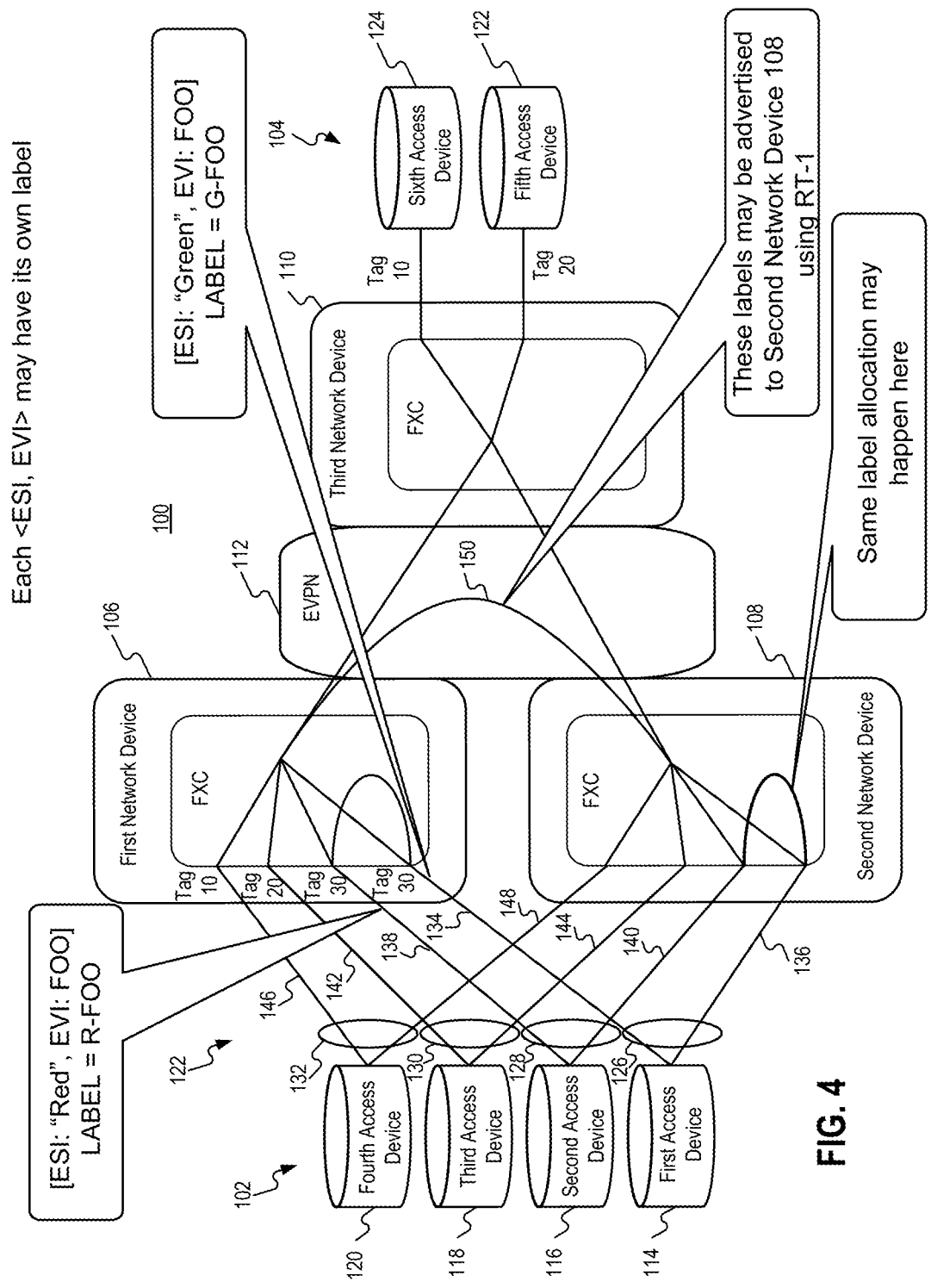
FIG. 4 is a block diagram of an operating environment for providing local switching that shows a failure may be handled with Ethernet Virtual Private Network (EVPN) Border Gateway Protocol (BGP) label option label per <ESI, EVI>.
Figure 5:
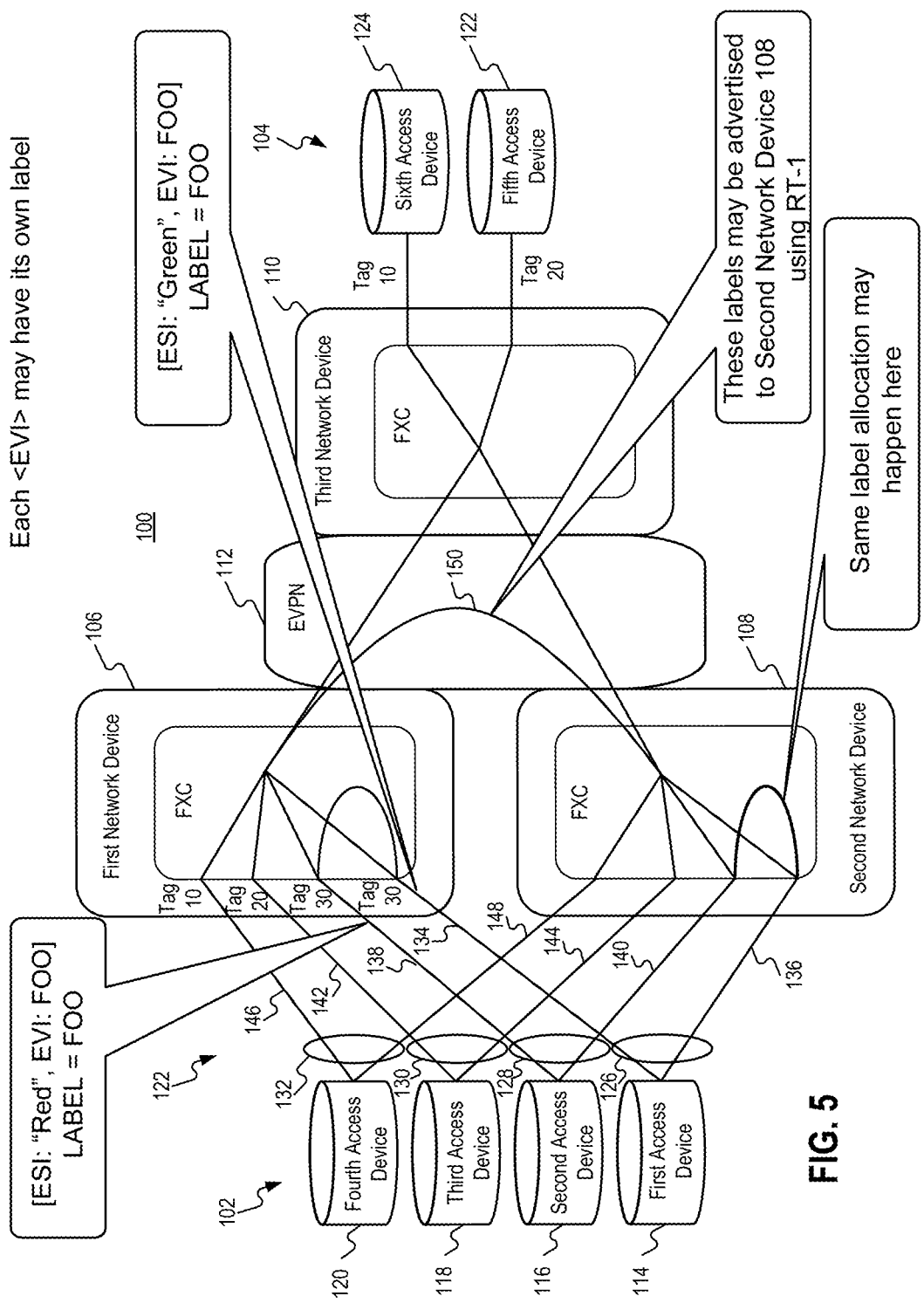
FIG. 5 is a block diagram of an operating environment for providing local switching that shows a failure may be handled with EVPN BGP label option label per <EVI>.

As stated above, embodiments of the disclosure may work with, but not limited to, two EVPN BGP label options: i) label per <Ethernet Segment Identifier (ESI), EVPN instance (EVI)>; and ii) label per <ESI>. FIG. 3 shows a failure on second segment second link 140. FIG. 4 shows how this failure may be handled with EVPN BGP label option label per <ESI, EVI> and FIG. 5 shows how this failure may be handled with EVPN BGP label option label per <EVI>.

As shown in FIG. 4, each <ESI, EVI> may have its own label. For example, with ESI: "Red", EVI: FOO, the label for second segment 128 may comprise R-FOO at first network device 106. Similarly, with ESI: "Green", EVI: FOO, the label for first segment 126 may comprise G-FOO at first network device 106. These labels may be advertised by first network device 106 to second network device 108 using EVPN BGP RT-1 for example. The same label allocations may be made by second network device 108 and advertised by second network device 108 to first network device 106 using EVPN BGP RT-1 also. Below is a more detailed example of RT-1 and RT-4 labels that may be advertised. Consequently, on second network device 108:

Receives per ES/EAD routes from first network device 106
RT-1: [RD+ESI+ETH-TAG]
RDx+Red+All'F (NH=first network device 106)
RDx+Green+All'F (NH=first network device 106)
Receives per EVI/EAD routes from first network device 106
RT-1: [RD+ESI+ETH-TAG]
RDx+Red+30 (NH=first network device 106+Label=R-Foo)
RDx+Green+30 (NH=first network device 106+Label=G-Foo)
Receives Ethernet-Segment routes from first network device 106
RT-4: [RD+ESI+IP]
RDx+Red+IP—first network device 106
RDx+Green+IP—second network device 108

Accordingly, second network device 108 may know that it is peering with first network device 106 and it has two backup paths for each ESI in case of local failure.

In this FIG. 4 example, when a failure on second segment second link 140 occurs (e.g., "Red" ESI) as shown in FIG. 3, second network device 108 may withdraw its per ES/EAD and Ethernet-Segment Routes for ESI RED as described above. Also, second network device 108 may know to forward traffic from "Green" ESI to first network device 106 via EVPN core 112 to reach second access device 116. Second network device 108 may know to use remote route information because "Red" is failing locally. Therefore traffic may be sent to: NH=first network device 106, Label=R-Foo. On first network device 106, packets coming from second network device 108 over the EVPN core 112 may be directly forwarded to "Red" device.

As shown in FIG. 5, each <EVI> may have its own label. For example, with ESI: "Red", EVI: FOO, the label for second segment 128 may comprise FOO at first network device 106. Similarly, with ESI: "Green", EVI: FOO, the label for first segment 126 may comprise FOO at first network device 106. These labels may be advertised by first network device 106 to second network device 108 using EVPN BGP RT-1 for example. The same label allocations may be made by second network device 108 and advertised by second network device 108 to first network device 106 using EVPN BGP RT-1 also. Below is a more detailed example of RT-1 and RT-4 labels that may be advertised. Consequently, on second network device 108:

Receives per ES/EAD routes from first network device 106
RT-1: [RD+ESI+ETH-TAG]
RDx+Red+All'F (NH=first network device 106)
RDx+Green+All'F (NH=first network device 106)
Receives per EVI/EAD routes from first network device 106
RT-1: [RD+ESI+ETH-TAG]
RDx+Red+30 (NH=first network device 106+Label=Foo)
RDx+Green+30 (NH=first network device 106+Label=Foo)
Receives Ethernet-Segment routes from first network device 106
RT-4: [RD+ESI+IP]
RDx+Red+IP—first network device 106
RDx+Green+IP—second network device 108

Accordingly, second network device 108 may know that it is peering with first network device 106 and it has two backup paths for each ESI in case of local failure.

In this FIG. 5 example, when a failure on second segment second link 140 occurs (e.g., "Red" ESI) as shown in FIG. 3, second network device 108 may withdraw its per ES/EAD and Ethernet-Segment Routes for ESI RED as described above. Also, second network device 108 may know to forward traffic from "Green" ESI to first network device 106 via EVPN core 112 to reach second access device 116. Second network device 108 may know to use remote route information because "Red" is failing locally. Therefore traffic may be sent to: NH=first network device 106, Label=Foo.

Regarding first network device 106, there may be more stages to be carried out as compare to the previous description with respect to FIG. 4 (i.e., as compared to the label per <ESI,EVI> case). For example, packets coming from second network device 108 may come with LABEL=FOO as described above. However, that label may not be specific enough for second network device 108 to figure out where to send the packets. First network device 106 may also be receiving an Ethernet Segment route withdraw from second network device 108 for ESI "Red". Accordingly, second network device 108 may know that ESI has failed on second network device 108. Therefore, packets coming with LABEL=FOO may be directly forwarded to the "Red" device by second network device 108.

Figure 6:
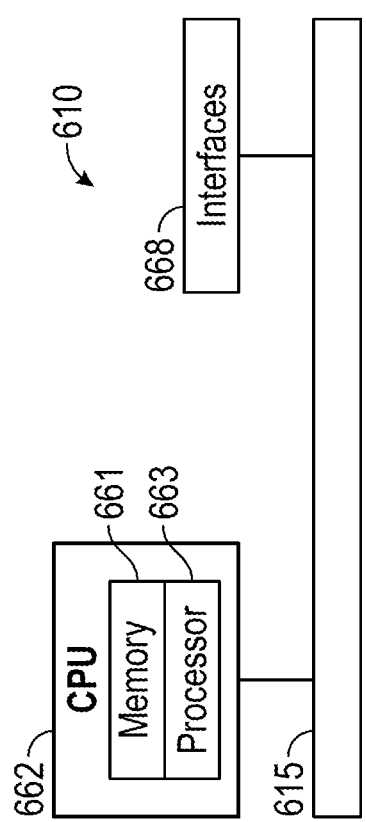
FIG. 6 is a block diagram of a network device.

FIG. 6 shows an example network device 610 that may comprise any one or more of first end plurality of edge devices 102, second end plurality of edge devices 104, first network device 106, second network device 108, third network device 110, and Ethernet Virtual Private Network (EVPN) core 112. A network device 610 may include a master central processing unit (CPU) 662, interfaces 668, and a bus 615 (e.g., a PCI bus). When acting under the control of appropriate software or firmware, CPU 662 may be responsible for executing packet management, error detection, and/or routing or forwarding functions. CPU 662 may accomplish all these functions under the control of software including an operating system and any appropriate applications software. CPU 662 may include one or more processors 663 such as a processor from any family of microprocessors. Consistent with embodiments of the disclosure, processor 663 may have hardware for controlling the operations of network device 610. A memory 661 (e.g., such as non-volatile RAM and/or ROM) may also form part of CPU 662.

Interfaces 668 may be provided as interface cards (e.g., "line cards"). They may control the sending and receiving of data packets over the network and sometimes support other peripherals used with network device 610. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. These interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow master microprocessor 662 to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the router.

Regardless of the network device's configuration, it may employ one or more memories or memory modules (including memory 661) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 7A:
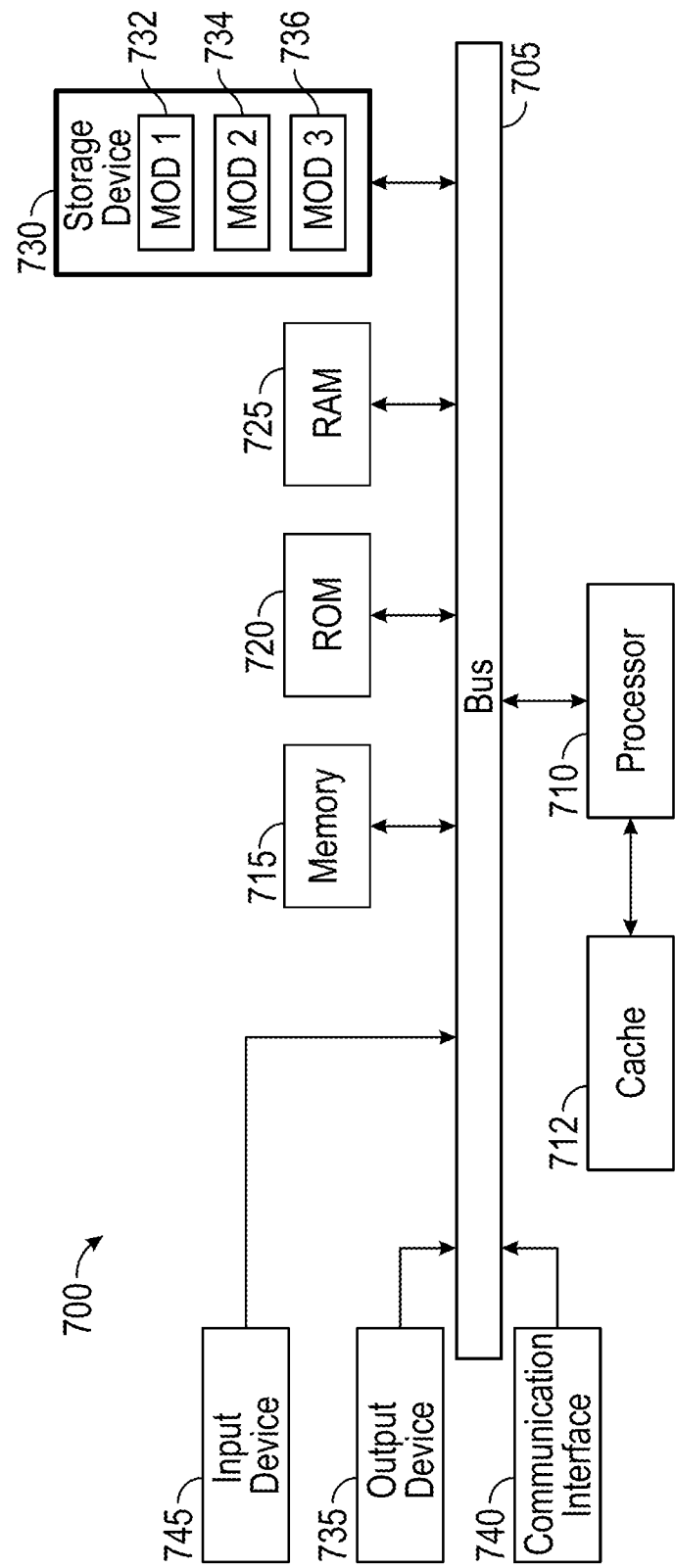
FIGS. 7A and 7B are block diagrams of a system.
Figure 7B:
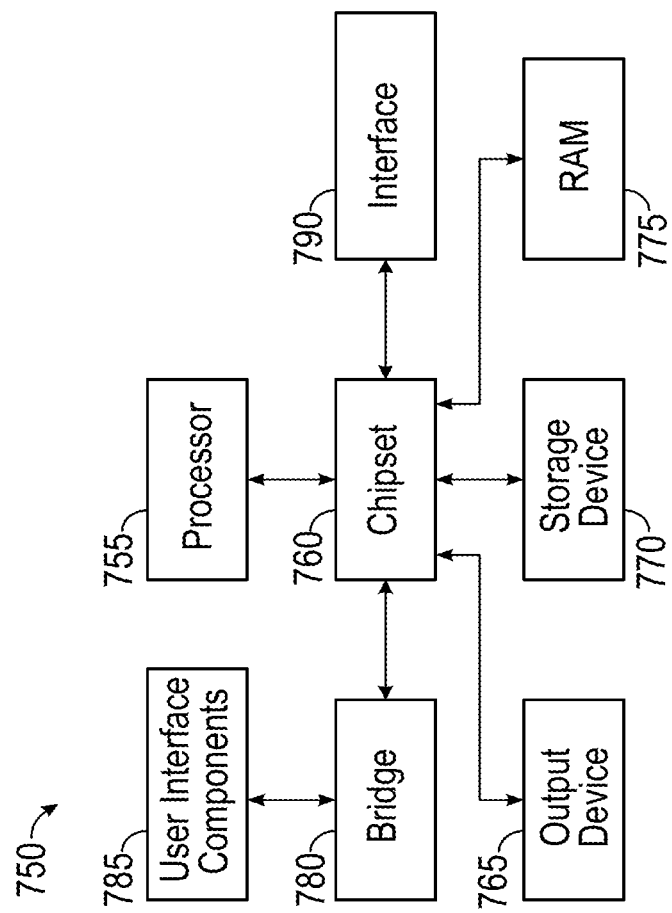

FIG. 7A and FIG. 7B illustrate example system embodiments. The more appropriate embodiment will be apparent to those of ordinary skill in the art when practicing the present technology. Persons of ordinary skill in the art will also readily appreciate that other system embodiments are possible.

FIG. 7A shows a system bus computing system architecture 700 wherein the components of the system are in electrical communication with each other using a bus 705. System bus computing system architecture 700 may comprise any one or more of plurality of first end plurality of edge devices 102, second end plurality of edge devices 104, first network device 106, second network device 108, third network device 110, and Ethernet Virtual Private Network (EVPN) core 112. System 700 may include a processing unit (CPU or processor) 710 and a system bus 705 that may couple various system components including system memory 715, such as a read only memory (ROM) 770 and a random access memory (RAM) 775, to processor 710. System 700 may include a cache of high-speed memory connected directly with, in close proximity to, or integrated as part of processor 710. System 700 may copy data from the memory 715 and/or storage device 730 to a cache 717 for access by processor 710. In this way, cache 717 may provide a performance boost that may avoid processor 710 delays while waiting for data. These and other modules may control or be configured to control processor 710 to perform various actions. Other system memory 715 may be available for use as well. Memory 715 may include multiple different types of memory with different performance characteristics. Processor 710 may include any general purpose processor and a hardware module or software module, such as a module 1 732, a module 2 734, and a module 3 736 stored in storage device 730, configured to control processor 710 as well as a special-purpose processor where software instructions are incorporated into the actual processor design. Processor 710 may be a completely self-contained computing system, containing multiple cores or processors, a bus, memory controller, cache, etc. A multi-core processor may be symmetric or asymmetric.

To enable user interaction with computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms. In some instances, multimodal systems may enable a user to provide multiple types of input to communicate with computing device 700. Communications interface 740 may generally govern and manage the user input and system output. There may be no restriction on operating on any particular hardware arrangement and therefore the basic features here may easily be substituted for improved hardware or firmware arrangements as they are developed.

Storage device 730 may be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 may include software modules 732, 734, 736 for controlling the processor 710. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B shows an example computer system 750 that may comprise any one or more of plurality of first end plurality of edge devices 102, second end plurality of edge devices 104, first network device 106, second network device 108, third network device 110, and Ethernet Virtual Private Network (EVPN) core 112. Computer system 750 may have a chipset architecture that may be used in executing the described method 200 above. Computer system 750 may be an example of computer hardware, software, and firmware that can be used to implement the disclosed technology. System 750 may include a processor 755, representative of any number of physically and/or logically distinct resources capable of executing software, firmware, and hardware configured to perform identified computations. Processor 755 may communicate with a chipset 760 that may control input to and output from processor 755. In this example, chipset 760 may output information to output 765, such as a display, and may read and write information to storage device 770, which can include magnetic media, and solid state media, for example. Chipset 760 may also read data from and write data to RAM 775. A bridge 780 for interfacing with a variety of user interface components 785 may be provided for interfacing with chipset 760. Such user interface components 785 may include a keyboard, a microphone, touch detection and processing circuitry, a pointing device, such as a mouse, and so on. Inputs to system 750 may come from any of a variety of sources, machine generated and/or human generated.

Chipset 760 may also interface with one or more communication interfaces 790 that can have different physical interfaces. Such communication interfaces may include interfaces for wired and wireless local area networks, for broadband wireless networks, as well as personal area networks. Some processes for generating, displaying, and using the GUI may include receiving ordered datasets over a physical interface or may be generated by processor 755 analyzing data stored in storage 770 or 775. Further, the machine can receive inputs from a user via user interface components 785 and execute appropriate functions, such as browsing functions by interpreting these inputs using processor 755.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

detecting, by a first network device, a failure of a first segment first link of a first segment, the first segment having a first segment identifier and the first segment first link being connected to the first network device;

sending, by the first network device, a route withdraw indicating the first segment identifier in response to detecting the failure of the first segment first link of the first segment;

receiving, by a second network device, the route withdraw, wherein the first network device is connected to a first edge device over the first segment first link and to a second edge device over a second segment first link, wherein the second network device is connected to the second edge device over a first segment second link and to the second edge device over a second segment second link, wherein the second network device is peered with the first network device using Ethernet Virtual Private Network (EVPN) Border Gateway Protocol (BGP) Route Type-4 (RT-4), and wherein each of the first network device and the second network device is operative to locally route a data traffic between the first edge device and the second edge device; and forwarding, by the second network device in response to receiving the route withdraw, traffic received from the first network device to the first segment second link of the first segment connected to the second network device, wherein the traffic is received from the first network device over a backup connection over an Ethernet Virtual Private Network (EVPN) core.

2. The method of claim 1, wherein prior to forwarding the traffic received from the first network device to the first segment second link of the first segment connected to the second network device, receiving the traffic at the first network device from the second segment first link of a second segment connected to the first network device.

3. The method of claim 1, wherein sending the route withdraw comprises sending the route withdraw indicating the withdraw of an EVPN BGP RT-4 route.

4. The method of claim 1, wherein detecting by the first network device comprises detecting by the first network device configured to provide Flexible Cross-Connect (FXC) VLAN-aware service.

5. The method of claim 1, wherein forwarding by the second network device comprises forwarding by the second network device configured to provide Flexible Cross-Connect (FXC) VLAN-aware service.

6. The method of claim 1, wherein detecting by the first network device comprises detecting by the first network device comprising a network router.

7. The method of claim 1, wherein forwarding by the second network device comprises forwarding by the second network device comprising a network router.

8. A system comprising:
a first network device comprising:
a first memory storage; and
a first processing unit coupled to the first memory storage, wherein the first processing unit is operative to:
detect a failure of a first segment first link of a first segment, the first segment having a first segment identifier and the first segment first link being connected to the first network device, and
send a route withdraw indicating the first segment identifier in response to detecting the failure of the first segment first link of the first segment; and
a second network device comprising:
a second memory storage; and
a second processing unit coupled to the second memory storage, wherein the second processing unit is operative to;
receive the route withdraw, wherein the first network device is connected to a first edge device over the first segment first link and to a second edge device over a second segment first link, wherein the second network device is connected to the second edge device over a first segment second link and to the second edge device over a second segment second link, wherein the second network device is peered with the first network device using Ethernet Virtual Private Network (EVPN) Border Gateway Protocol (BGP) Route Type-4 (RT-4), and wherein each of the first network device and the second network device is operative to locally route a data traffic between the first edge device and the second edge device, and
forward, in response to receiving the route withdraw, traffic received from the first network device to the first segment second link of the first segment connected to the second network device, wherein the traffic is received from the first network device over a backup connection over an Ethernet Virtual Private Network (EVPN) core.

9. The system of claim 8, wherein the route withdraw indicates the withdraw of an EVPN BGP RT-4 route.

10. The system of claim 8, wherein the first network device is configured to provide Flexible Cross-Connect (FXC) VLAN-aware service.

11. The system of claim 8, wherein the second network device is configured to provide Flexible Cross-Connect (FXC) VLAN-aware service.

12. The system of claim 8, wherein the first network device comprising a network router.

13. The system of claim 8, wherein the second network device comprising a network router.

14. A method comprising:

using Ethernet Virtual Private Network (EVPN) Border Gateway Protocol (BGP) Route Type-4 (RT-4) to peer a first network device and a second network device together, wherein the first network device is connected to a first edge device over the first segment first link and to a second edge device over a second segment first link, wherein the second network device is connected to the second edge device over a first segment second link and to the second edge device over a second segment second link, and wherein each of the first network device and the second network device is operative to locally route a data traffic between the first edge device and the second edge device;

detecting, by the first network device, a failure of the first segment first link of a first segment, the first segment having a first segment identifier and the first segment first link being connected to the first network device; and sending, by the first network device, a route withdraw indicating the first segment identifier in response to detecting the failure of the first segment first link of the first segment the route withdraw indicates the withdraw of an EVPN BGP RT-4 route.

15. The method of claim 14, further comprising:
receiving, by the second network device, the route withdraw; and
forwarding, by the second network device in response to receiving the route withdraw, traffic received from the first network device to the first segment second link of the first segment connected to the second network device, wherein the traffic is received from the first network device over a backup connection over an Ethernet Virtual Private Network (EVPN) core, wherein prior to forwarding the traffic received from the first network device to the first segment second link of the first segment connected to the second network device, receiving the traffic at the first network device from the second segment first link of a second segment connected to the first network device.

16. The method of claim 15, wherein detecting by the first network device comprises detecting by the first network device configured to provide Flexible Cross-Connect (FXC) VLAN-aware service.

17. The method of claim 15, wherein forwarding by the second network device comprises forwarding by the second network device configured to provide Flexible Cross-Connect (FXC) VLAN-aware service.

18. The method of claim 15, wherein detecting by the first network device comprises detecting by the first network device comprising a network router.

19. The method of claim 15, wherein forwarding by the second network device comprises forwarding by the second network device comprising a network router.

* * * * *